3,334,016
HEDAMYCIN AND PROCESS FOR ITS
PRODUCTION
Henry Schmitz, Syracuse, N.Y., assignor to Bristol-Myers Company, New York, N.Y., a corporation of Delaware
Filed Oct. 24, 1966, Ser. No. 588,700
4 Claims. (Cl. 167—65)

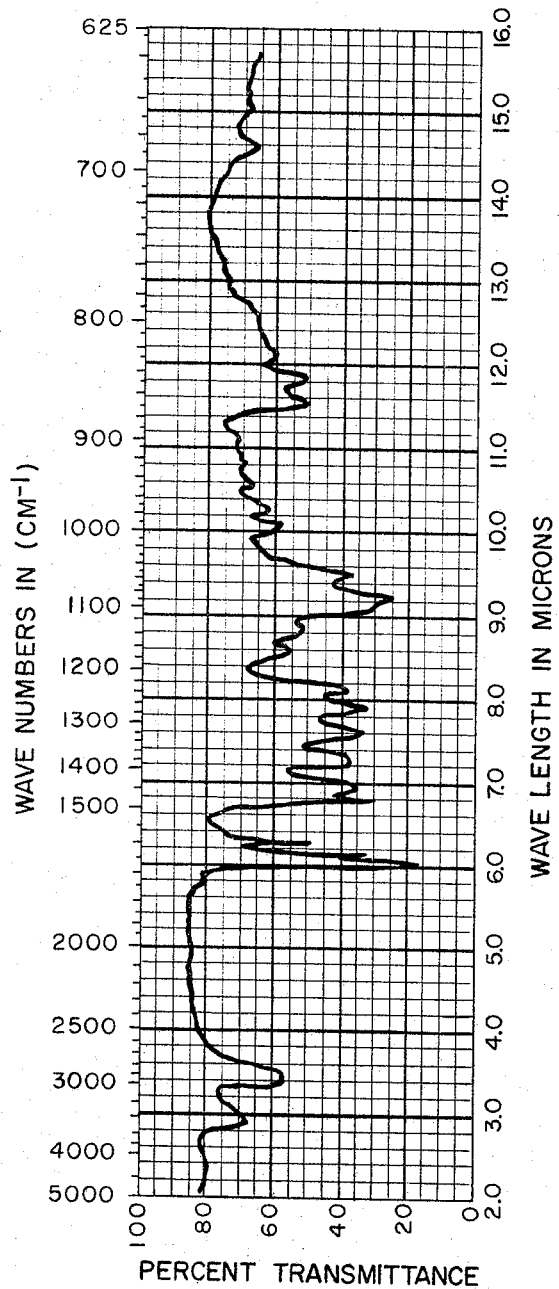

ABSTRACT OF THE DISCLOSURE

This invention relates to a new and useful substance herein designated hedamycin, and to processess for its production. More particularly, this invention relates to processes for its production by fermentation of a hedamycin-producing strain of *Streptomyces griseoruber* Yamaguchi and Saburi and methods for its recovery and purification. The invention embraces this antibiotic in dilute solutions, as crude concentrates, and as purified solids. Hedamycin is useful to inhibit the growth of adenocarcinoma of the duodenum in hamster. Hedamycin also has an inhibitory action against the growth of certain microorganisms, including bacteria, yeast and protozoa. Thus, hedamycin is useful in the treatment of bacterial, yeast and protozoa infections, in separating and classifying mixtures of microorganisms for biological research, and for the removal of microorganisms from laboratory equipment and medical and dental instruments.

---

This application is a continuation-in-part of my prior copending application Ser. No. 412,373, filed Nov. 19, 1964, now abandoned.

There is provided according to the present invention the process for the production of an antibiotic, designated hedamycin, which comprises cultivating a hedamycin-producing strain of *Streptomyces griseoruber* Yamaguchi and Saburi designated *Streptomyces griseoruber* strain C–1150, e.g., A.T.C.C. 15422, in an aqueous carbohydrate solution containing a nitrogenous nutrient under submerged aerobic conditions until substantial activity against HeLa cells is imparted to said solution, and then, if desired, recovering said hedamycin from said solution. There is further included within the scope of the present invention the hedamycin so produced.

The microorganism producing the antibiotic hedamycin of the present invention was isolated from a sample of soil collected in Brazil, and is a new strain of *Streptomyces griseoruber* Yamaguchi and Saburi 1995, and has been designated *Streptomyces griseoruber* strain C–1150. A culture of the living organism given the laboratory designation C–1150, has been deposited in the American Type Culture Collection, Rockville, Md. and added to its permanent collection of microorganisms as A.T.C.C. 15422.

The media used in taxonomic studies were inoculated with a 48-hour tryptone yeast extract broth culture [Gottlieb, D. Appl. Microbiol. 9, 55 (1961)].

*Streptomyces griseoruber* strain C–1150 characteristically forms grayish-yellow to grayish-red vegetative mycelium and chains of smooth walled spores arranged in open and closed spirals. The culture is melanin negative.

Petri dish cultures of culture A.T.C.C. 15422 grown at 28° C. on glucose-yeast-malt agar and examined at 2, 7, and 14 days revealed the following microscopic morphology:

Vegetative mycelium: Branched, no evidence of fragmentation.

Aerial mycelium: Monopodially branched, ca. 0.7–1.0μ in diameter.

Spore chain morphology: Spores arranged in open and closed spirals, dense clusters formed in heavily sporulated areas.

Conidia: Catenulate, smooth walled, elongated ovoid, ca. 0.75×1.2–2.0μ.

*Streptomyces griseoruber* strain C–1150 exhibits the following cultural characteristics when grown in a cross-hatch pattern on the indicated nutrient media for 14 days at 28° C. The capitalized color names used in the description correspond to those in "A Dictionary of Color," Maerz et al., Ed. 2, McGraw-Hill Book Company, New York, 1950, and refer to specific color chips. The ISCC-NBS common color name (see Kelly, K. L., and D. B. Judd, "The ISCC-NBS Method of Designating Colors and a Dictionary of Color Names," United States Department of Commerce, National Bureau of Standards, Circular 553, Washington, D.C., 1955) for each color chip is given parenthetically. Vegetative mycelium color was determined after removal of existing aerial growth.

Medium No. 1: Tomato paste-oatmeal agar

Vegetative: Moderate, grayish-yellow to tan.
Aerial: Abundant, powdery, Cobweb Pl 5 B–7 (light grayish yellowish brown #79).
Reverse: Butterscotch Pl 14 F–9 (moderate brown #58).
Soluble Pigment: Pale greenish brown.
Remarks: Melanin-negative.

Medium No. 2: Blucose-yeast-malt agar

Vegetative: Moderate, grayish yellow.
Aerial: Abundant, powdery, Cobweb Pl 5 B–7 (light grayish yellowish brown #79).
Reverse: Roe Pl 12 H–6 (light yellowish brown #76) to Papyrus Pl 12 D–7 (light brown #57).
Soluble Pigment: Pale yellowish brown.
Remarks: Melanin-negative.

Medium No. 3: Nutrient agar

Vegetative: Moderate, pale pinkish tan.
Aerial: White to Flesh Pl 11 A–12 (yellowish gray #93 to pale orange yellow #73), sporulation limited to margin of growth.
Reverse: Formosa Pl 12 A–8 (medium orange #53 to light brown #57).
Soluble pigment: Light pinkish brown.
Remarks: Melanin-negative.

Medium No. 4: Tryptone-glucose agar

Vegetative: Moderate, yellowish tan to pinkish tan.
Aerial: Moonmist Pl 12 A–2 (yellowish gray #93), sporulation limited to margin of growth.
Reverse: Cinnamon Pink Pl 5 C–10 (light reddish brown #42).
Soluble pigment: Light pinkish brown.
Remarks: Melanin-negative.

Medium No. 5: Glycerol-calcium malate agar

Vegetative: Moderate, Chalet Red Pl 6 K–10 (grayish red #19).
Aerial: Abundant, powdery, Cobweb Pl 5 B–7 (light grayish yellowish brown #79).
Reverse: Java Pl 8 L–10 (dark brown #59) to Picadilly Pl 7 H–10 (moderate reddish brown).
Soluble pigment: Light brown.
Remarks: Medium cleared.

Medium No. 6: Glucose asparagine agar

Vegetative: Moderate, light yellow.
Aerial: Moderate, light gray.
Reverse: Pale yellow.
Soluble pigment: None.

Medium No. 7: Starch-ammonium agar (inorganic salts-starch agar)

Vegetative: Moderate, pale pinkish tan to grayish pink.
Aerial: Abundant, powdery, Mist Pl 53 B-1 (reddish gray #22) to Dove Grey Pl 45 B-1 (purplish gray #233).
Reverse: Red to grayish red.
Soluble pigment: None.
Remarks: Positive hydrolysis of starch (5 mm. at 8 days).

Medium No. 8: Sucrose nitrate agar

Vegetative: Abundant, grayish yellow with pink margin.
Aerial: Abundant, powdery off-white to Flax Pl 12 B-2 (grayish yellow #90).
Reverse: Outer edge—Old Coral Pl 3 J-10 (moderate red #15). Center—Corn Pl 10 J-5 (moderate yellow #87).
Soluble pigment: Pale yellow orange.

Medium No. 9: Glucose-nitrate agar

Vegetative: Abundant, wrinkled, pale to grayish pink.
Aerial: Abundant, powdery becoming granular off-white to Moonmist Pl 12 A-2 (yellowish gray #93).
Reverse: Outer edge—Raspberry Glace Pl 4 F-4 (moderate red #15 to grayish red #19). Center—Leghorn Pl 10 D-3 (pale yellow #89 to grayish yellow #90) to Raspberry Glace.
Soluble pigment: None.

Medium No. 10: Glycerol nitrate agar

Vegetative: Abundant, pale yellow to grayish yellow, margin red.
Aerial: Abundant, powdery, Flesh Pl 11 A-2 (pale orange yellow #73 to yellowish gray #93) with Gull Grey Pl 36 A-3 (purplish gray #233) margin.
Reverse: Outer edge—Old Coral Pl 3 J-10 (moderate red #15). Center—Apricot Pl 10 F-7 (moderate orange #53).
Soluble pigment: None.

Tables I and II present results obtained in a series of miscellaneous physiological tests. These tests were carried out at 28° C. unless otherwise indicated.

TABLE I

| Medium | Remarks |
| --- | --- |
| Peptone Iron Agar and 0.1-Yeast Extract. | H₂S negative. |
| Tryptose Blood Agar | No hemolysis in 3 days, no soluble pigment formed. |
| Bennett's Agar | Catalase positive. |
| Organic Nitrate Broth | Rapid reduction to nitrite. |
| Synthetic Nitrate Broth | Do. |
| Starch-Ammonium Agar | Starch hydrolysis positive. |
| Tryptone-Yeast Extract Broth | Melanin negative. |
| Purple Milk | No coagulation, slight peptonization at 14 days, pH unchanged. |
| 15% Gelatin | 30% Liquefaction of gelatin at 21 days, no soluble pigment formed, thin colorless to pale cream membrane at bottom of liquified zone. |
| Temperature Range | Grows well on Oatwell-Soy Peptone Agar at 28 and 35° C. No growth at 10 or 45° C. |
| Oxygen Rrequirement | Aerobic, will not grow under microaerophilic or anaerobic conditions. |
| Potato Plug | Vegetative growth pink becoming grayish yellow orange, sporulation abundant at tip of plug Gravel Pl 13 A-4 (light grayish yellowish brown No. 79), plug discolored orange to light reddish brown, melanin negative. |

TABLE II.—ASSIMILATION OF CARBON COMPOUNDS IN A SYNTHETIC MEDIUM [1]

| | |
| --- | --- |
| Xylose + | Dulcitol − |
| Arabinose + | Mannitol + |
| Rhamnose + | Sorbitol − |
| Galactose + | Inositol + |
| Glucose + | Glycerol + |
| Maltose + | Salicin (+) |
| Sucrose + | Na Acetate (+) |
| Lactose + | Na Citrate (+) |
| Cellobiose + | Na Oxalate (−) |
| Raffinose + | Na Salicylate − |
| Soluble Starch + | Na Tartrate − |
| Dextrin + | Na Succinate (+) |
| Inulin + | Ca Malate (+) |
| | Control − |

[1] Pridham, T. G. and Gottlieb, D., Assimilation of Carbon Compounds in Synthetic Medium, J. Bacteriol. 56: 107–114, (1948).
+ = Definite utilization; (+) = Probable utilization; (−) = No utilization; −− = No growth.

Streptomyces griseoruber strain C-1150 (A.T.C.C. 15422) resembles Streptomyces griseoruber Yamaguchi and Saburi in a number of important cultural and morphological characteristics, namely:

(1) spores smooth walled, arranged in open and closed spirals;
(2) color of sporulating aerial mycelium (light grayish yellowish brown); and
(3) color of vegetative growth on synthetic media (yellow to red)

Differences in the carbohydrate utilization pattern, action on milk, and the inability to form dark brown or black soluble pigments on proteinaceous media (melanin-negative) distinguish culture A.T.C.C. 15422 from the holotype culture, Streptomyces griseoruber Yamaguchi and Saburi.

Streptomyces griseoruber strain C-1150 when grown under suitable conditions, produces hedamycin. A fermentation broth containing hedamycin is prepared by inoculating spores of mycelia of the hedamycin-producing organism into a suitable medium and then cultivating under aerobic conditions. For the production of hedamycin, cultivation on a solid medium is possible, but for production in large quantity, cultivation in a liquid medium is preferable. The temperature of the cultivation may be varied over a wide range, 20–35° C., within which the organism may grow, but a temperature of 25–30° C. and a neutral pH, i.e., 6.0–8.0, are preferred. In the submerged aerobic fermentation of the organism for the production of hedamycin, the medium contains as the source of carbon a commercially available glyceride oil or a carbohydrate such as glycerol, glucose, maltose, sucrose, lactose, dextrin, starch, etc., in pure or crude states and as the source of nitrogen, an organic material such as soybean meal, distillers solubles, peanut meal, cottonseed meal, meat extract, peptone, fish meal, yeast extract, corn steep liquor, etc., and when desired inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent No. 513,324 and in British Patents Nos. 730,341 and 736,325, and in United States Patents Nos. 2,691,618, 2,658,018, 2,653,-899, 2,586,762, 2,516,080, 2,483,892, 2,609,329 and 2,709,-672. In aerated submerged culture, an antifoam such as liquid paraffin, fatty oils, or silicone, is used. More than one kind of carbon source, nitrogen source, or antifoam may be used for the production of hedamycin. Generally the cultivation is continued until at least several hundred mcg./ml. of hedamycin is accumulated in the medium. The active substance is contained about equally in the mycelia and in the fermentation liquor.

The mycelia are separated from the fermentation liquor and extracted with water-soluble solvents such as acetone, methanol, ethanol and other low alcohols. The solvent extract is evaporated until an aqueous residue remains which is combined with the fermentation liquor filtrate, and extracted with a water-immiscible solvent such as butanol, methyl isobutyl ketone, chloroform and ethyl acetate. Crude hedamycin is obtained by drying the solvent extract, and purified by chromatography, e.g., alumina column, and by liquid-liquid extraction methods, e.g., Craig's countercurrent distribution technique, and pure hedamycin is isolated as a crystalline solid.

Hedamycin is a stable yellow crystalline substance, and melts at 243–245° C. (hot stage, uncorrected) with decomposition. It is very soluble in benzene, ethyl acetate, chloroform, pyridine, tetrahydrofuran, dimethylformamide and carbon tetrachloride, moderately soluble in acetone, and alcohols, slightly soluble in ether, and insoluble in water and aliphatic hydrocarbons and cyclohexane. It dissolves freely in water in the presence of ascorbic acid, citric acid or tartaric acid, and is extracted by chloroform from aqueous buffer solutions above pH 6.9.

The ultraviolet spectrum of a chloroform solution of hedamycin shows a major peak at 245m$\mu$, ($\alpha$=50 in chloroform, $\alpha$=80 in methanol), a shoulder at 260–265 m$\mu$ and a weak broad peak at 430m$\mu$. The absorption peaks are unchanged in 0.01 N aqueous hydrochloric acid and shift to 254 m$\mu$ ($\alpha$=50) and 324 m$\mu$ ($\alpha$=17) in 0.01 N aqueous sodium hydroxide.

The elemental analysis of hedamycin is as follows: C=65.65%; H=6.89%; N=3.76%; O=23.72% (by difference). No other elements are present. The molecular weight by thermoelectric determination is 730 and by mass spectroscopy 748. The neutral equivalent is 379. The analysis and molecular weight indicate that the molecular formula is $C_{41}H_{52}O_{11}N_2$.

The infrared absorption spectrum of hedamycin pelleted in potassium bromide, as shown in the attached drawing, exhibits absorption maxima at the following wave lengths in microns: 2.9 (broad), 3.45 (broad), 6.05, 6.15, 6.28, 6.8, 9.2 and 11.6.

The NMR spectrum of hedamycin indicates the presence of aromatic and aliphatic hydrogens, four of which are exchangeable. Integration of the curve and relation to a tertiary methyl band at 0.07 p.p.m. indicates the presence of a total number of 52±2 protons.

Hedamycin dissolves in concentrated hydrochloric acid with a yellow color which remains unchanged on heating. In concentrated sulfuric acid, it gives a bright red solution with intense fluorescence in ultraviolet light (absorption peaks at 263 and 365 m$\mu$). The addition of hydrogen peroxide gives no perceptible color change. Solutions turn red on the addition of sodium hydrosulfite and revert to yellow or treatment with hydrogen peroxide. Sodium bicarbonate or carbonate do not dissolve hedamycin, but aqueous sodium hydroxide gave a purple solution. Hedamycin dissolves in acetic anhydride, and on addition of a drop of concentrated sulfuric acid, the solution turns green-yellow. A crystalline acetate is obtained.

Hedamycin is stable in the absence of light and air, but solutions deteriorate gradually. Solids are stable for several months when refrigerated in the presence of a desiccant.

Hedamycin has been found to have antitumor activity against adenocarcinoma of the duodenum in hamsters. Daily injections of hedamycin resulted in significant inhibition of the growth of this tumor. Hedamycin was administered by the intraperitoneal route for five consecutive days at the indicated dosage. Treatment was started one day after a fragment of the tumor had been implanted subcutaneously. One day past treatment, the animals were sacrificed, the tumors excised, and weighed. The test data are summarized in Table III.

TABLE III.—EFFECT OF HEDAMYCIN ON THE TRANSPLANTED "ADENOCARCINOMA OF THE DUODENUM" HAMSTER TUMOR [1]

| Test No. | Dosage (mg./kg./day) | Weight Difference Treated-control (gm.) | Response (Treated/Control) | | Survivors |
|---|---|---|---|---|---|
| | | | Tumor Size (gm.) | Effect [2] | |
| 1 | 0.2 | −13 | 185/867 | .21 | 6/6 |
| | 0.1 | −15 | 362/867 | .41 | 6/6 |
| | 0.05 | −11 | 262/867 | .30 | 6/6 |
| | 0.025 | −9 | 487/867 | .56 | 5/6 |
| 2 | 0.8 | −22 | Toxic | Toxic | 1/6 |
| | 0.4 | −18 | 342/925 | .36 | 6/6 |
| | 0.2 | −17 | 176/925 | .19 | 5/6 |
| | 0.1 | −12 | 691/925 | .74 | 6/6 |
| | 0.05 | −13 | 547/925 | .59 | 4/6 |
| 3 | 0.3 | −9 | 230/622 | .36 | 5/6 |
| | 0.15 | −9 | 432/622 | .69 | 5/6 |

[1] These data were obtained by Southern Research Institute, Birmingham, Alabama.
[2] An effect of 0.42 or less considered significant tumor inhibition.

Hedamycin has demonstrated marked cytotoxicity for HeLa cells, human epidermoid carcinoma of cervix, in tissue culture studies. The $ID_{50}$ (dose required to cause a 50% decrease in net protein production) was found to be $5.2 \times 10^{-10}$ gm./ml.

The in vitro inhibitory activity of hedamycin for bacteria, yeasts and protozoa was determined by means of the two-fold serial dilution method. The material was dissolved in aqueous ascorbic acid, filter sterilized and dilutions made in media appropriate to the various organisms. Inocula for tests with yeast and bacteria were prepared so that final culture dilutions of 1:20,000 would be obtained when 0.5 ml. of microbial suspension was added to 0.5 ml. of test media containing the various concentrations of hedamycin. The yeasts were incubated for 18 hours at 30° C., and aerobic and facultative bacteria were incubated for 18 hours at 37° C. Anaerobic bacteria were incubated for 40 hours at 37° C. in Brewer anaerobic jars. Inhibitory end points were determined by visual examination.

Inocula for protozoan tests were prepared by adjusting a 72 hour broth culture to an optical density of 0.5 at a wavelength of 530 m$\mu$ on a Bausch and Lomb Spectronic-20 colorimeter. The standardized suspensions were then used to seed the appropriate media at the following percentages: *Tetrahymena pyriformis*, 7.5; *Ochromonas malhamensis*, 10.0; *Crithidia fasciculata*, 5.0. Tubes containing various concentrations of hedamycin were inoculated with the suspension and incubated for 48 hours at room temperature under a fluorescent light source.

Hedamycin was found to inhibit bacteria, yeast and protozoa at low concentration in in vitro tests. Representative minimum inhibitory concentrations (MIC) in heart infusion broth were as follows:

TABLE IV.—ANTIMICROBIAL SPECTRUM OF HEDAMYCIN

| Test Organism | Test Medium [1] | MIC (µg./ml.) |
|---|---|---|
| Anaerobic Bacteria: | | |
| Peptococcus prevotii ATCC 9321 | HIB | 0.1 |
| Clostridium chauvoei ATCC 10092 | HIB | 3.2 |
| Aerobic and facultative bacteria: | | |
| Aerobacter aerogenes | HIB | 3.12 |
| Alkaligenes faecalis ATCC 8750 | HIB | 0.31 |
| Bacillus subtilis ATCC 6633 | HIB | 0.125 |
| Corynebacterium xerosis | HIB | 0.031 |
| Diplococcus pneumoniae | HIB+10% serum | 0.031 |
| Escherichia coli 01495 | HIB | 1.6 |
| Escherichia coli ATCC 8739 | HIB | 3.1 |
| Klebsiella pneumoniae | HIB | 1.6 |
| Mycobacterium phlei | HIB | 0.031 |
| Mycobacterium ranae | HIB | 0.125 |
| Mycobacterium smegmatis No. 607 | HIB | 0.25 |
| Proteus morganii | HIB | 6.25 |
| Proteus retgerei | HIB | 3.12 |
| Proteus vulgaris ATCC 9930 | HIB | 6.25 |
| Pseudomonas aeruginosa | HIB | 6.25 |
| Salmonella paratyphi A | HIB | 1.25 |
| Salmonella paratyphi B | HIB | 1.25 |
| Salmonella typhosa | HIB | 0.31 |
| Shigella dysenteriae | HIB | 1.25 |
| Shigella sonnei | HIB | 0.31 |
| Staphylococcus aureus Smith | HIB | 0.0062 |
| Staphylococcus aureus 1633-2 | HIB | 0.031 |
| Staphylococcus aureus 52-75 | HIB | 0.016 |
| Streptococcus pyogenes Digonnet | HIB+10% serum | 0.003 |
| Yeasts: | | |
| Candida albicans | NEO | 25.0 |
| Klocekera brevis ATCC 9774 | NEO | 0.8 |
| Saccharomyces cerevisiae | NEO | 3.2 |
| Protozoa: | | |
| Crithidia fasciculata | PMM | 12.5 |
| Ochromonas malhamensis | PMM | 1.6 |
| Tetrahymena pyriformis | PMM | 0.8 |

[1] HIB=Heart Infusion Broth ("Difco"); NEO=Neopeptone Broth (2% glucose, 1% neopeptone, 2% agar, pH adjusted to 5.7); PMM= Protozoa Maintenance Medium (West, Murrell and Barbera, 1960).

Hedamycin was also found to be an inducer of lysogenic bacteria. In tests with a lysogenic strain of *Escherichia coli* K12, the ratios of phage produced to surviving bacteria were as follows:

TABLE V.—PHAGE PRODUCTION

| Concentration (µg./ml.): | Phage/bacteria |
|---|---|
| 2 | 1.64 |
| 1 | 1.02 |
| 0.5 | 0.120 |
| 0.25 | 0.090 |
| 0.125 | 0.034 |
| 0.062 | 0.045 |
| 0 | 0.008 |

The acute intraperitoneal $LD_{50}$ of hedamycin in Swiss mice was 0.3 mg./kg.

The following examples will serve to illustrate the present invention without limiting it thereto.

*Example 1.—Fermentation*

*Streptomyces griseoruber* strain C–1150, A.T.C.C. 15422, is cultivated for 48 hours at 27° C. in shaker flasks in an aqueous medium containing 2% glucose, 1.0% cottonseed endosperm flour (Pharmamedia, Trader Oil Mill Company, Fort Worth, Tex.), 1.0% (by volume) corn steep liquor, 0.40% calcium carbonate, 0.3% ammonium sulfate, and 0.003% zinc sulfate heptahydrate. A 4% inoculum is then used to seed an aqueous production medium containing 1.0% glucose, 1% soybean meal, 0.5% sodium chloride, and 0.1% calcium carbonate. The fermentation is carried out on rotary shakers in 500 ml. Erlenmeyer flasks (20) containing 100 ml. of medium for 3 days at 27° C. The fermentation liquor is found to have substantial activity against HeLa cells.

*Example 2.—Recovery of hedamycin*

Fermentation broth (1711 liters, pH 8.5), obtained as described hereinabove, is mixed with diatomaceous earth filter aid ("Dicalite") (53 kg./1000 liters) and filtered. The filtrate is pre-extracted with one-eighth volume (210 liters) of textile spirits and extracted with chloroform (440 liters). The chloroform extract is separated and concentrated to four liters. The wet mycelial filter cake is extracted with methanol (600 liters). The extract is concentrated to the aqueous phase (80 liters) and is extracted with an equal volume of chloroform. The combined chloroform extracts are placed on two alumina chromatography columns (3 x 15"). Colored impurities are removed by washing with ether-chloroform and the active substances (8 g.) were eluted with chloroform-methanol.

For further purification, the material is again placed on two alumina chromatography columns, and the peak fraction is crystallized from ethyl acetate-ether. Countercurrent distribution in a Craig-Post machine employing phosphate buffer, pH 7, and ethyl acetate gives a slow moving, basic fraction from which hedamycin was obtained in crystalline form. Hedamycin is found to have a melting point of 243–245° C., with decomposition (hot stage, uncorrected).

*Example 3*

A. *Fermentation.*—Shake-flask fermentation of the hedamycin-producing culture, *Streptomyces griseoruber* strain C–1150. A.T.C.C. 15422, is carried out according to the following procedure. Inoculum is prepared by growing a vegetative suspension of the culture on a New Brunswick rotary shaker for 48 hours at 28° C. The speed of rotation is 230 r.p.m. The medium used consisted of 2.0% cerelose, 1.0% Pharmamedia (Trader Oil Mill Co., Fort Worth, Tex.), 1.0% corn-steep liquor on a volume basis, 0.40% calcium carbonate, 0.30% ammonium sulfate, and 0.003% zinc sulfate.

A 4% inoculum is used to seed a production medium consisting of 3.0% cerelose, 1.0% linseed meal, 0.50% sodium chloride, and 0.30% calcium carbonate. The fermentations are carried out on New Brunswick rotary shakers in 500 ml. Erlenmyer flasks containing 100 ml. of medium. The rotation speed is 230 r.p.m. The incubation temperature is 28° C. and the culture is harvested at 4 days.

The seed and production media described above are also used for hedamycin production in large fermentors. In a typical run, 800 gallons of seeded fermentation medium are agitated with dual rotary impellers turning at 155 r.p.m. and sparged with air flowing 75 ft.³/minute at .86 atmospheres head pressure. The broth is harvested at 130 hours and contains 60 µg./ml. of the antibiotic.

B. *Recovery.*—Assays against *Bacillus subtilis* at pH 8, induction of lysogenic *Escherichia coli* W1709 (λ), and bioautography of thin-layer chromatograms against *B. subtilis* indicate the presence of sufficient quantities of hedamycin in diatomaceous filtered broth to preclude the necessity of extracting whole broth or mycelium. Approximately 3000 liters filtered broth from a fermentor are extracted with 0.25 volume of chloroform and the extract is concentrated to 3.0 liters. Dilution of the concentrate with 3.3 volumes of ethyl ether gives 223.5 g. of crude, crystalline hedamycin. Recrystallization with 50% by weight carbon treatment produces 177.2 g. of hedamycin with an infrared spectrum corresponding to the drawing and with a melting point of 242.5–243° C.

Hedamycin thus obtained is further purified by chromatography on alumina columns (Harshaw catalytical grade 0109P) using increasing concentrations of chloroform in ether as eluent or by counter-current distribution employing a Craig apparatus and either ethyl acetate-phosphate buffer, pH 6.9, or ethyl acetate-methanol-water-"Skellysolve B" (1.3:1:1:0.6). The peak fractions were dried and recrystallized from chloroform-ether (1:15) or ethyl acetate-ether (1:5). The crystalline hedamycin obtained is found to have a melting point of 243–245° C., with decomposition (hot stage, uncorrected).

While this invention has been described and exemplified in terms of its preferred embodiment, those skilled in the art will appreciate that modifications can be made without departing from the spirit and scope of this invention.

What is claimed is:

1. A composition of matter designated as hedamycin, said composition being characterized by ready solubility in benzene, ethyl acetate, chloroform, pyridine, tetrahydrofuran, dimethylformamide and carbon tetrachloride; moderate solubility in acetone and alcohols; slightly soluble in ether; and insoluble in water, aliphatic hydrocarbons and cyclohexane; and exhibiting in the pure state yellow crystals; a melting point of 243–245° C.; a molecular weight of 748 by mass spectroscopy; an elemental analysis as follows: 65.65% carbon, 6.89% hydrogen, 3.76% nitrogen, and 23.72% oxygen (by difference); an ultraviolet absorption spectrum in chloroform exhibiting maxima at 245 and 430 m$\mu$ and a shoulder at 260–265 m$\mu$, an ultraviolet spectrum in 0.01 N aqueous hydrochloric acid exhibiting maxima at 245 and 430 m$\mu$ and a shoulder at 260–265 m$\mu$, an ultraviolet absorption spectrum in 0.01 N aqueous sodium hydroxide exhibiting maxima at 254 and 324 m$\mu$, and an infrared absorption spectrum in potassium bromide as shown in the drawing.

2. The process of producing a biologically active substance, identified as hedamycin, which comprises cultivating *Streptomyces griseoruber* A.T.C.C. 15422 under submerged aerobic conditions in an aqueous carbohydrate solution containing a nitrogenous nutrient until substantial activity versus HeLa cells is produced in said medium.

3. The process of claim 2 and the additional step of recovering from the broth the hedamycin thus produced.

4. The process of claim 2 wherein the cultivation is performed at a temperature of substantially from 25–30° C. and for about one to six days.

References Cited
UNITED STATES PATENTS

| | | | |
|---|---|---|---|
| 3,142,618 | 7/1964 | Nakazawa et al. | 167—65 |
| 3,147,184 | 9/1964 | Gaeumann et al. | 167—65 |

ALBERT T. MEYERS, *Primary Examiner.*

JEROME D. GOLDBERG, *Assistant Examiner.*